(12) United States Patent
Huang (10) Patent No.: US 9,904,810 B2
(45) Date of Patent: *Feb. 27, 2018

(54) ELECTRONIC DEVICE

(71) Applicants: NANNING FUGUI PRECISION INDUSTRIAL CO., LTD., Nanning (CN); HON HAI PRECISION INDUSTRY CO., LTD., New Taipei (TW)

(72) Inventor: Ying-Jui Huang, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 125 days.

This patent is subject to a terminal disclaimer.

(21) Appl. No.: 14/984,277

(22) Filed: Dec. 30, 2015

(65) Prior Publication Data
US 2017/0154194 A1 Jun. 1, 2017

(30) Foreign Application Priority Data
Nov. 27, 2015 (TW) .............................. 104139655 A (51) Int. Cl.
*G06F 21/86* (2013.01)
*H05K 5/00* (2006.01)
*G06F 21/87* (2013.01)

(52) U.S. Cl.
CPC .............. *G06F 21/86* (2013.01); *G06F 21/87* (2013.01); *H05K 5/0052* (2013.01)

(58) Field of Classification Search
CPC .................................. G06F 21/86; G06F 21/87
See application file for complete search history.

(56) References Cited

U.S. PATENT DOCUMENTS 9,271,410 B2* 2/2016 Lin ...................... H05K 5/0208
9,514,335 B2* 12/2016 Huang ................... G06F 21/87
9,798,902 B2* 10/2017 Ludlow .................. G06F 21/86
(Continued)

FOREIGN PATENT DOCUMENTS

| CN | 2786912 | 6/2006 |
| TW | M350951 | 2/2009 |
| TW | 201504906 | 2/2015 |

*Primary Examiner* — Thaddeus Plecha
(74) *Attorney, Agent, or Firm* — ScienBiziP, P.C.

(57) ABSTRACT

An electronic device with data protection features in case of unauthorized disassembly includes top cover, bottom cover, a printed circuit board (PCB) fixed on the top cover, and a plate coupled to the bottom cover. The PCB includes a plurality of terminal couplers and a protruding portion. The plate includes a plurality of terminal grooves and a latching member. At least two signal terminals are correspondingly received in at least two of the plurality of terminal grooves. When the signal terminals are electrically connected to the terminal couplers, a first relation signal, which is dependent upon the electrical paths defined by the signal terminals in the terminal grooves, is generated to enable the electronic device. When the signal terminals are not connected to the original terminal couplers, a second and different relation signal is generated by the PCB to disable the electronic device.

10 Claims, 9 Drawing Sheets

(56) References Cited

U.S. PATENT DOCUMENTS

| | | | |
|---|---|---|---|
| 2005/0079744 A1* | 4/2005 | Novotny | H05K 7/1092 439/66 |
| 2012/0047374 A1* | 2/2012 | Klum | G06F 21/86 713/192 |
| 2014/0283146 A1* | 9/2014 | Obukhov | G06F 21/78 726/34 |
| 2014/0325688 A1* | 10/2014 | Cashin | G06F 21/86 726/34 |

* cited by examiner

ELECTRONIC DEVICE

FIELD

The subject matter herein generally relates to electronic device with a function as anti-tamper.

BACKGROUND

Electronic devices store confidential data such as account information in components of the electronic device. In order to prevent an unauthorized person from accessing the components storing the confidential data, the components are located in a sealed housing. However, the housing of the electronic device must be able to be easily opened in order for a technician to repair or replace any components as necessary.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The disclosure is described in relation to an electronic device with data security.

Figure 1:
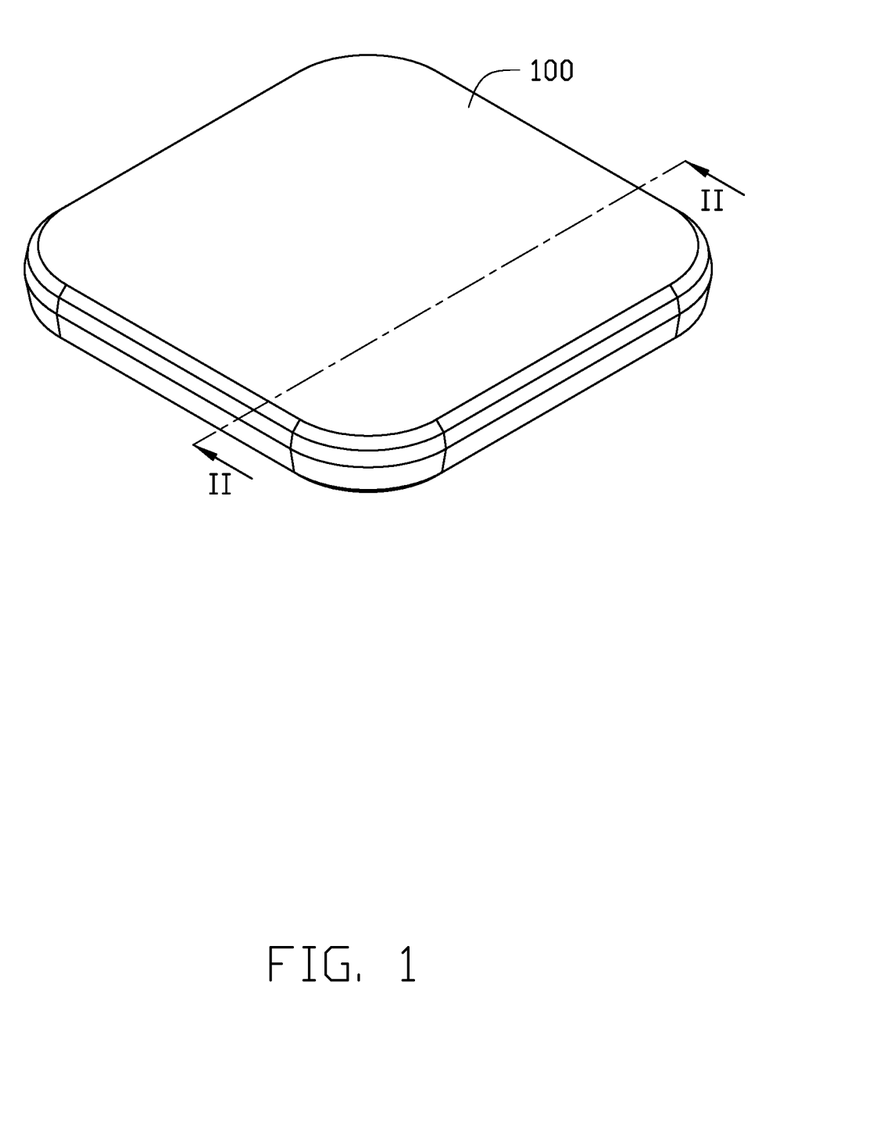
FIG. 1 is an isometric view of one embodiment of an electronic device.
Figure 2:
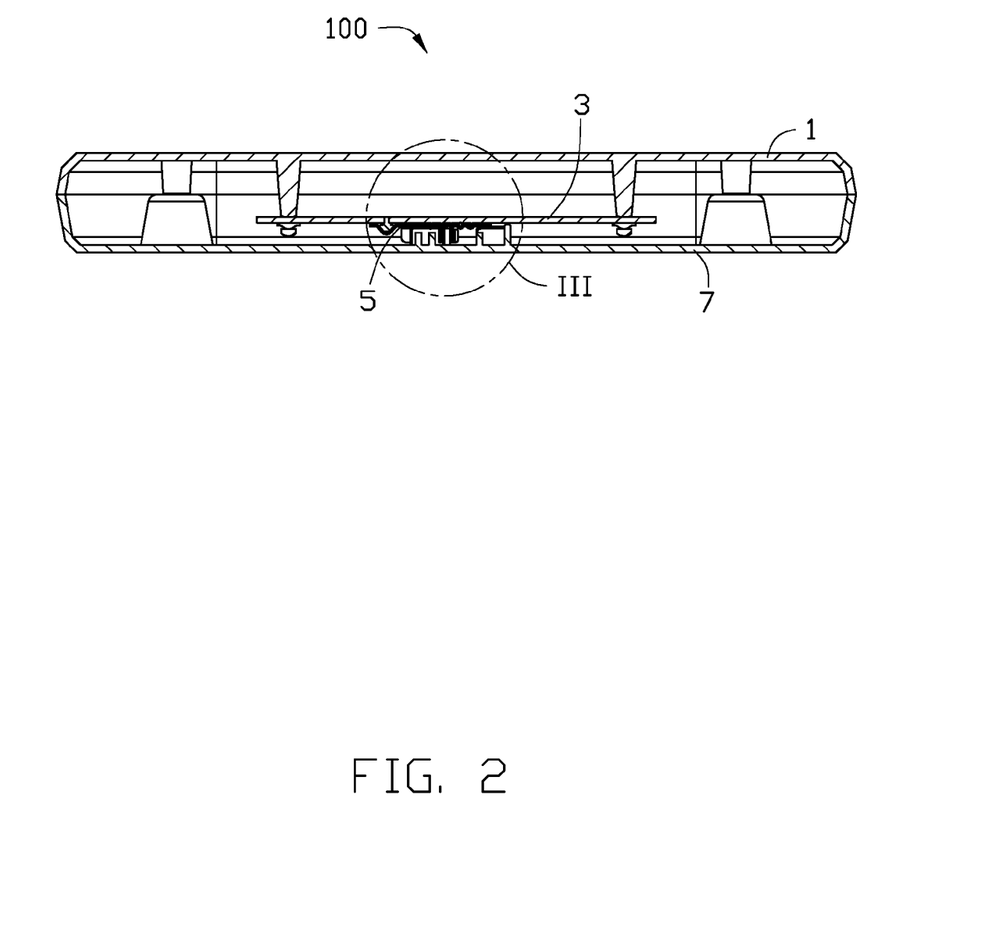
FIG. 2 is a sectional view taken along line II-II of FIG. 1, wherein the electronic device includes a conductive plate and a base unit.
Figure 3:
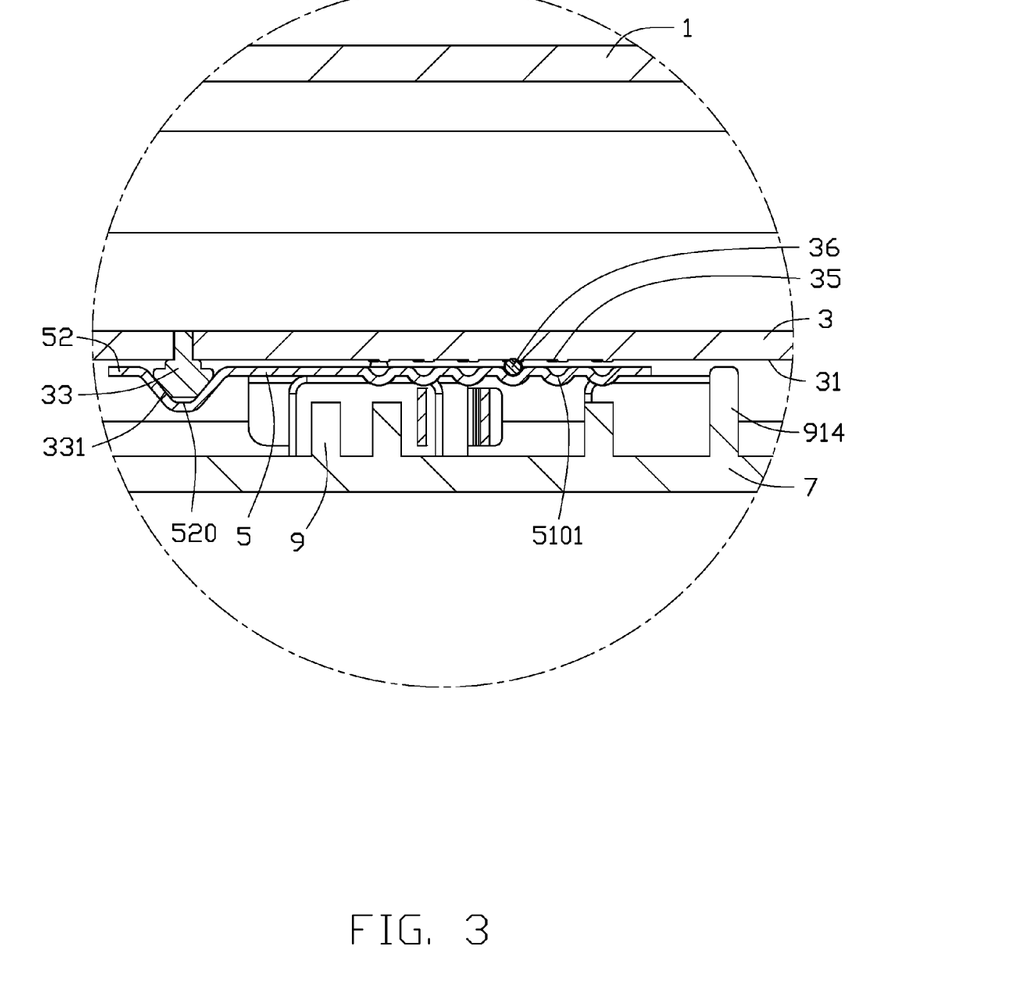
FIG. 3 shows encircled portion III of FIG. 2.

FIG. 1 illustrates one embodiment of an electronic device 10, which prevents an unauthorized person from accessing data in the components in the electronic device 10. Referring to FIG. 2 and FIG. 3, the electronic device 10 can be a set-top box, a router, a computer, a portable device, or other intelligent electronic device. The electronic device 10 includes a top cover 1, a printed circuit board (PCB) 3, a captively conductive plate (plate 5), and a bottom cover 7. In at least one embodiment, the bottom cover 7 includes a base unit 9 to support the plate 5.

The top cover 1 is detachably coupled to the bottom cover 7 defining a receiving space for receiving the PCB 3 and the plate 5. The PCB 3 fixed on the top cover 1, and includes a lower surface 31 facing the bottom cover 7 and a protruding portion 33 protruding from the lower surface 31. The PCB 3 is coupled to the plate 5 through the protruding portion 33.

Figure 4:
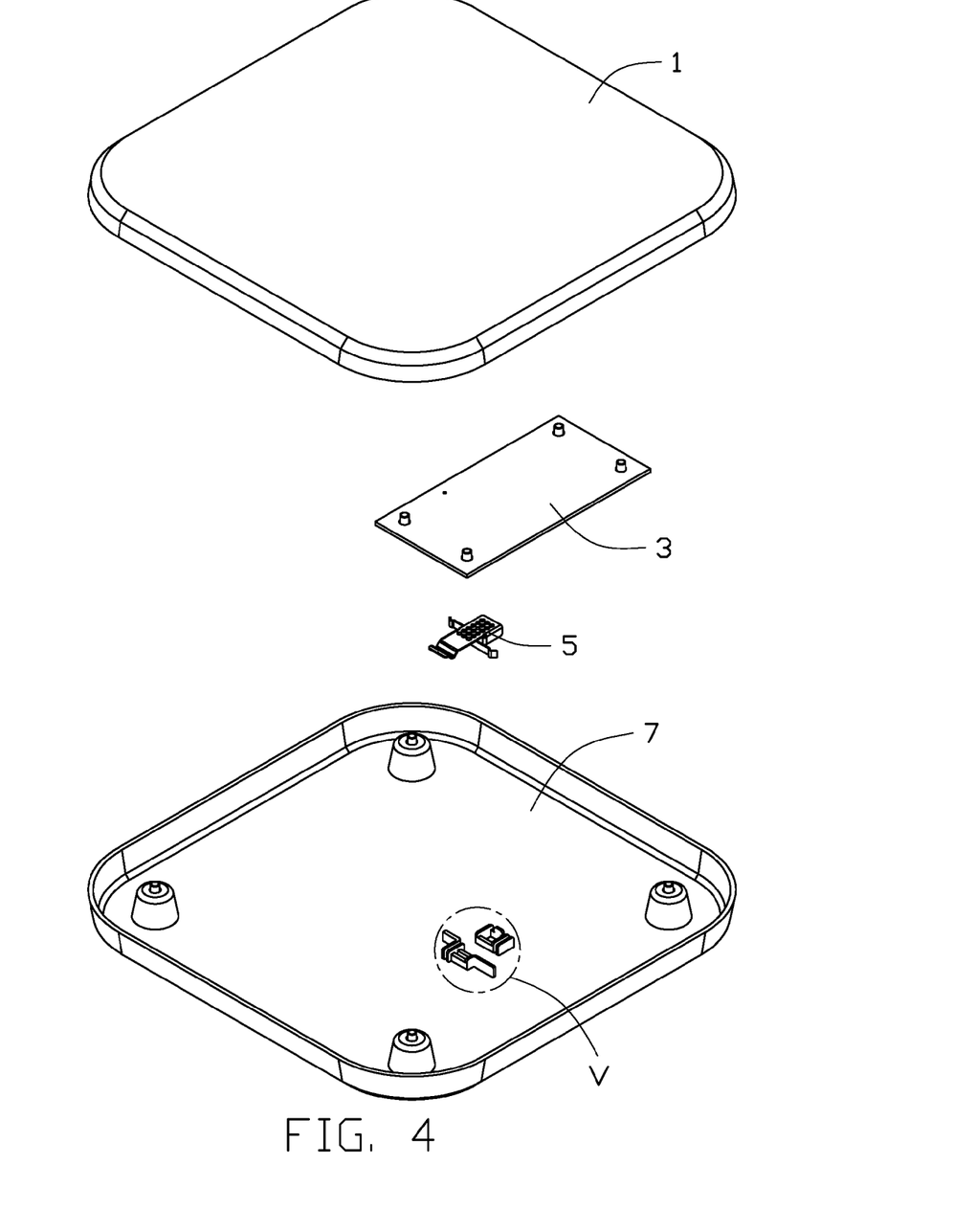
FIG. 4 is an exploded view of one embodiment electronic device of FIG. 1.
Figure 5:
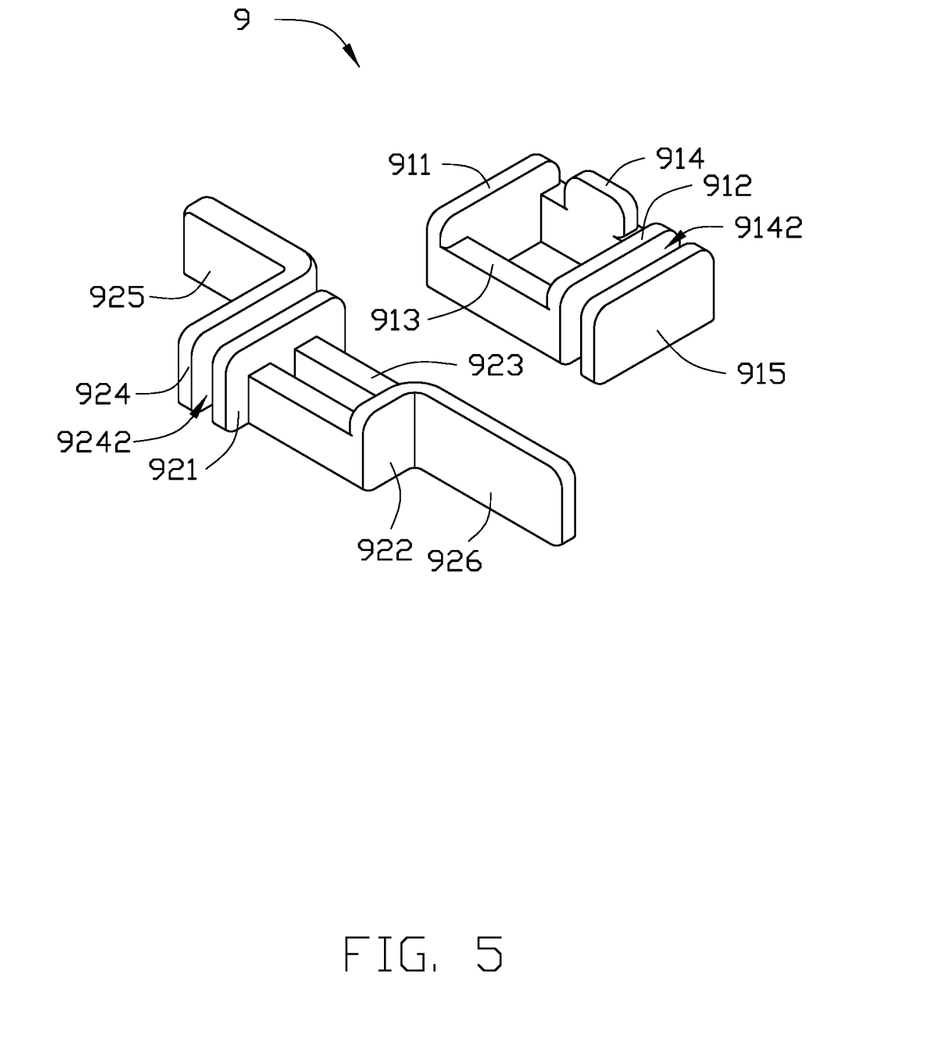
FIG. 5 shows encircled portion V of FIG. 4.

FIG. 4 shows a first aspect of the electronic device 10. FIG. 5 shows encircled portion V of the electronic device 10 in FIG. 4. The base unit 9 is set on the bottom cover 7 by process of injection molding. In other embodiment, the base unit 9 can be fixed on the bottom cover 7 by adhesive or other means of attachment. Referring to FIG. 5, the base unit 9 includes a first side wall 911, a second side wall 912, and a third side wall 913. The third side wall 913 is coupled to the first side wall 911, the second side wall 912, to a fourth side wall 914 opposite the third side wall 913, and to a fifth side wall 915. A first gap 9142 is formed between the second side wall 912 and the fifth side wall 915. A length of the second side wall 912 is greater than a length of the fifth side wall 915. A middle part of the fourth side wall 914 protrudes, making a height of the middle part of the fourth side wall 914 higher than that of the first side wall 911 and of the second side wall 912. A height of the third side wall 913 is smaller than that of the first side wall 911 and of the second side wall 912.

The base unit 9 further includes a sixth side wall 921, a seventh side wall 922, an eighth side wall 923 which is coupled to the sixth side wall 921 and to the seventh side wall 922, and a ninth side wall 924. A first stopper portion 925 extends from the ninth side wall 924, and a second stopper portion 926 extends from the seventh side wall 922. The respective heights of the sixth side wall 921 and of the seventh side wall 922 are each greater than that of the eighth side wall 923.

Figure 6:
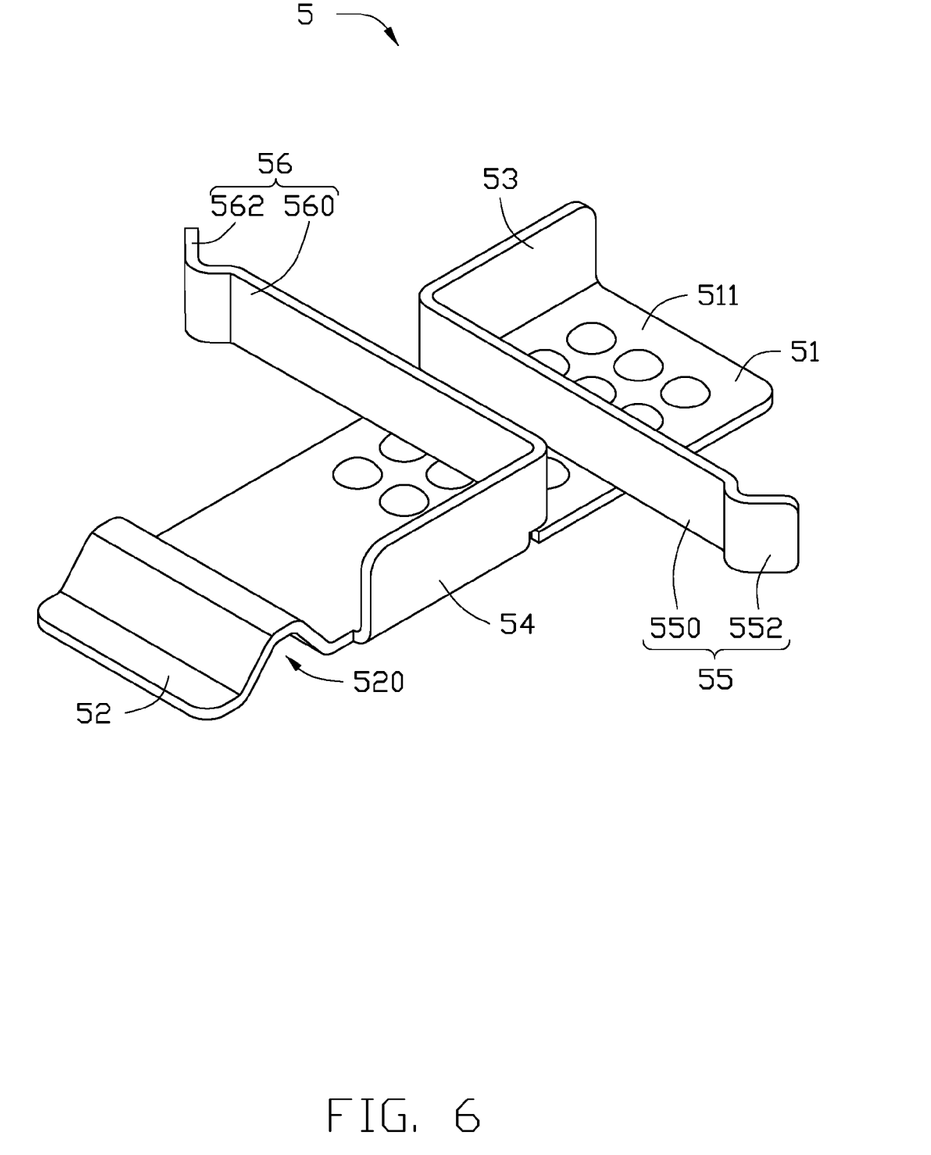
FIG. 6 is an isometric view of one embodiment of FIG. 2.

FIG. 6 illustrates one embodiment of the plate 5. The plate 5 includes a base board 51, a latching member 52 extending from one terminal of the base board 51, two dampers 53, 54, and two stretch arms 55, 56. The damper 53 extends vertically from one side of the base board 51, and is far away from the latching member 52. The damper 54 extends vertically from other side of the base board 51, and is close to the latching member 52. The stretch arm 55 extends vertically from a terminal of the damper 53, which is far away from the latching member 52. The stretch arm 56 extends vertically from a terminal of the damper 54 which is close to the latching member 52. The stretch arm 55 and the stretch arm 56 face each other across a certain distance. The stretch arm 55 includes a main portion 550 and a fasten portion 552 extending from one terminal of the main portion 550. The stretch arm 56 includes a main portion 560 and a fasten portion 562 extending from one terminal of the main portion 560. The damper 53 of the plate 5 is placed in the first gap 9142 of the base unit 9, to make the damper 53 movable in the first gap 9142. The damper 54 of the plate 5 is placed in the first gap 9242 of the base unit 9 to make the damper 54 movable in the first gap 9242.

Figure 7:
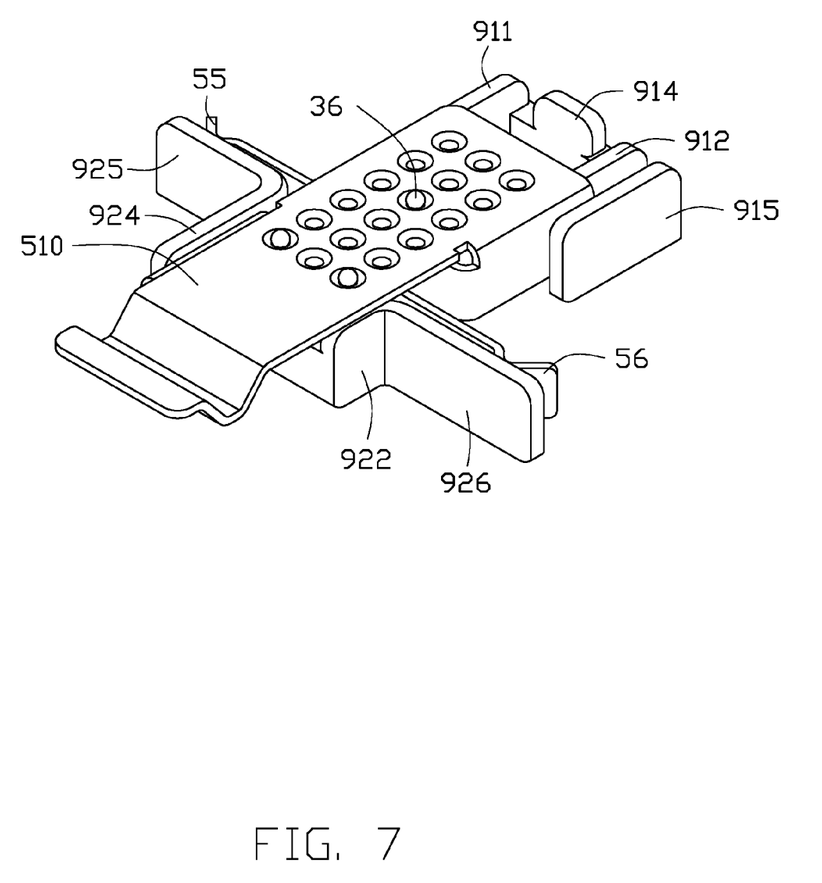
FIG. 7 is an assembled view of the conductive plate and the base unit of FIG. 2.

FIG. 7 illustrates the plate 5 and the base unit 9. The base board 51 includes an upper surface 510 facing the PCB 3 and a lower surface 511 facing the base unit 9. The two stretch arms, 55 and 56, are spaced a certain distance from the lower surface 511. The upper surface 510 defines a plurality of terminal grooves 5101 to receive at least one signal terminal 36. In at least one embodiment the signal terminal 36 is a round ball of conductive material. A diameter of each terminal groove 5101 is larger than a diameter of the signal terminal 36, which allows the signal terminal 36 to move freely in the terminal groove 5101. In other embodiments, the terminals 36 can be metal columns. In at least one embodiment, the number of terminals 36 is three. In other embodiments, the number of the terminals 36 can be more or less than two, but cannot exceed the number of the terminal grooves 5101.

The main portion 550 of the stretch arm 55 contacts the third side wall 913 of the base unit 9. The fasten portion 552 of the stretch arm 55 is fixed to the first stopper portion 925. The main portion 560 of the stretch arm 56 contacts the eighth side wall 923 of the base unit 9. The fasten portion 562 of the stretch arm 56 is fixed to the second stopper portion 926. The latching member 52 includes a V-shaped groove 520.

Figure 8:
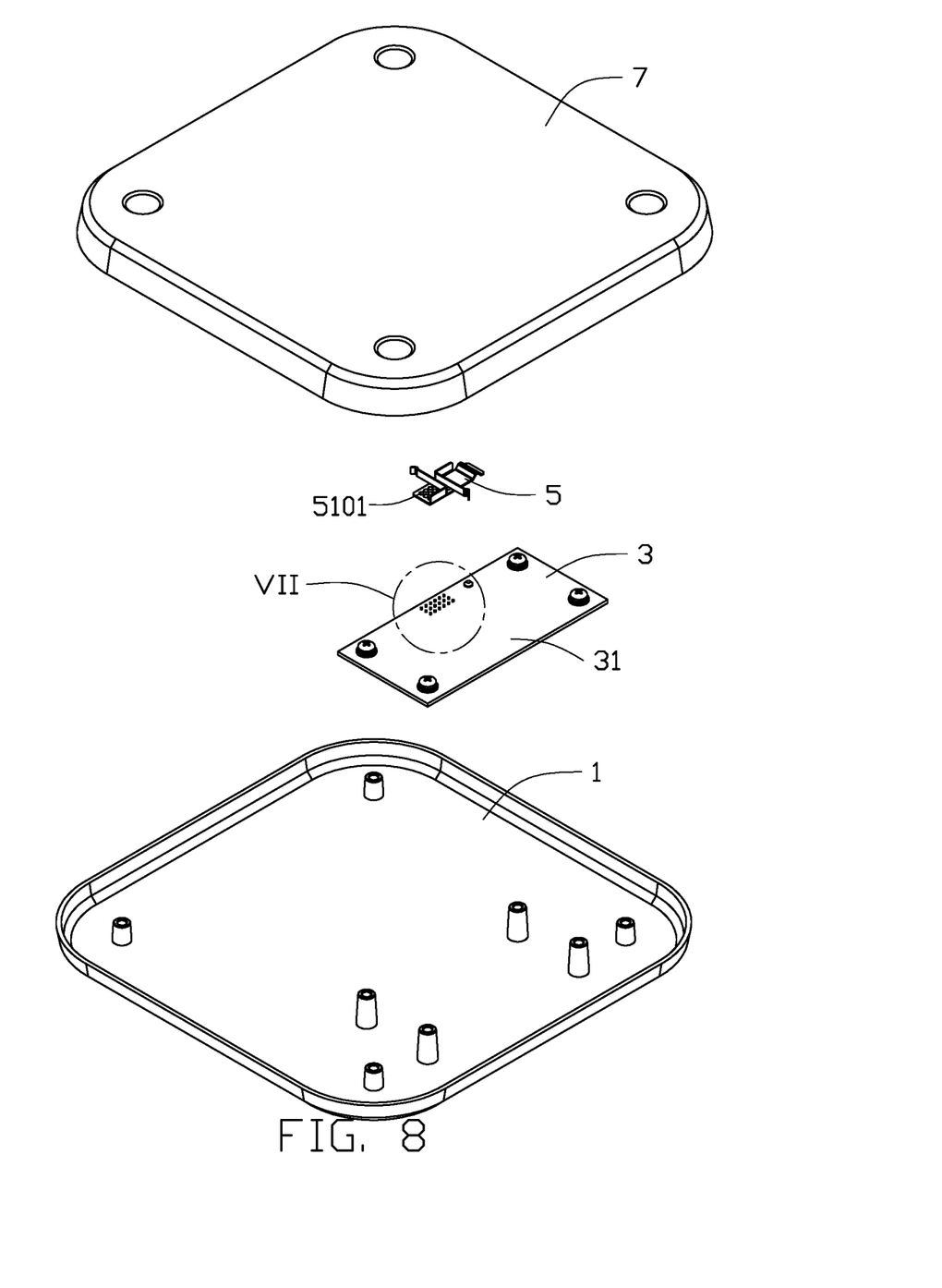
FIG. 8 is an exploded view of one embodiment of the electronic device of FIG. 1 viewed from another angle.
Figure 9:
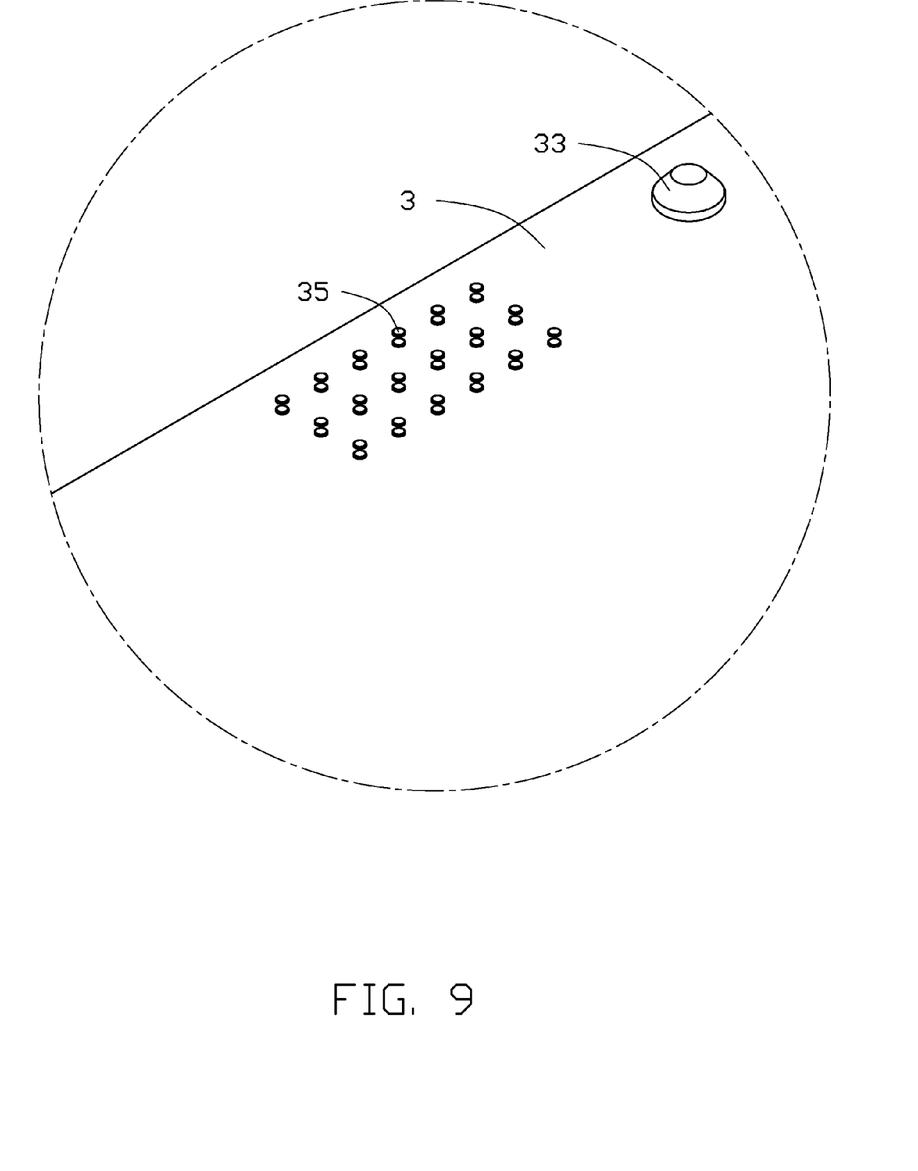
FIG. 9 shows encircled portion VII of FIG. 4.

FIG. 8 shows one embodiment of the electronic device 10 viewed from a second aspect. FIG. 9 shows encircled portion VII of FIG. 4. A plurality of terminal couplers 35 is defined on the lower surface 31 of the PCB 3, opposite to the terminal groove 5101 of the plate 5. In at least one embodiment, each of the terminal couplers 35 includes a pair of electrodes. Each pair of electrodes corresponds to one terminal groove 5101 of the plate 5. The protruding portion 33 has a shape of a circular truncated cone 331. The protruding portion 33 is coupled to the latching member 52 of the plate 5, to fix a position of the groove 520 of the latching member 52 on the base unit 9. When the top cover 1 is coupled to the bottom cover 7, the protruding portion 33 of the PCB 3 is engaged with the groove 520 of the latching member 52, making the terminals 36 contact the terminal couplers 35, for generating a first relation signal to set a protection program for the electronic device 100. The terminals 36 can be located in the terminal grooves 5101 randomly.

When the top cover 1 is disengaged from the bottom cover 7, the protruding portion 33 of the PCB 3 is separated from the groove 520 of the latching member 52. The base board 51 of the plate 5 slides to the fourth side wall 914 along the first side wall 911, the second side wall 912, the sixth side wall 921, and the seventh side wall 922 of the base unit 9, then striking the fourth side wall 914. The terminals 36 drop from the terminal grooves 5101 in such a way as to give no information to an unauthorized person as to the terminal grooves 5101 into which the terminals 36 should be replaced.

Following an unauthorized dissassembly, when the top cover 1 and the bottom cover 7 are assembled again, a locational relationship between the terminals 36 and the terminal grooves 5101 will be different from the original respective locations. Furthermore, when the electronic device 100 is powered on again after the reassembly, positions of the signal terminals are changed from initial positions on the terminal grooves, and a second relation signal is generated, indicating the current locational relationship between the signal terminals 36 and the terminal grooves 5101. The PCB 30 is utilized to compare the first relation signal to the second relation signal, and if the second relation signal is different from the first relation signal; the PCB 30 can disable the electronic device 100.

With the electronic device 100 described above, when an unauthorized person tries to extract or manipulate data in the system by detaching the top cover 1 from the bottom cover 7, the terminals 36 drop from the terminal grooves 5101 with no indication as to their respective original positions. When the protruding portion 33 of the PCB 3 is coupled to the groove 520 of the latching member 52, a second relation signal which is not the same as the first relation signal is generated, to prevent an unauthorized person from operating the electronic device 100.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. An electronic device comprising:
a top cover;
a bottom cover detachably coupled to the top cover;
a printed circuit board (PCB) fixed on the top cover and having a plurality of terminal couplers and a protruding portion;
a plate coupled to the bottom cover and comprising a plurality of terminal grooves and a latching member; and
at least two signal terminals are correspondingly received in at least two of the plurality of terminal grooves; when the top cover and the bottom cover are assembled, the protruding portion of the PCB is cooperatively coupled to the latching member of the plate, the at least two signal terminals being received in the at least two of the plurality of terminal grooves correspondingly and electrically coupled to corresponding ones of the plurality of terminal couplers;
wherein when the top cover is disconnected from the bottom cover, the protruding portion is separated from the latching member, and the at least two signal terminals drop from the at least two of the plurality of terminal grooves, when the top cover is connected to the bottom cover again and the at least two signal terminals are not received in the plurality of terminal grooves correspondingly, the at least two signal terminals are not electrically connected to corresponding ones of the plurality of terminal couplers correspondingly and the electronic device is unable to work.

2. The electronic device according to claim 1, wherein the plate comprises a base board, a latching member, two dampers, and two stretch arms corresponding to the two dampers respectively; the latching member extends from one terminal of the base board; the two dampers extends from two sides of the base board, and one damper is closer to the latching member than the other damper; each one of stretch arms extends from one terminal of the corresponding damper, and the two stretch arms space a certain distance.

3. The electronic device according to claim 2, wherein each of the stretch arms is vertical to the corresponding damper.

4. The electronic device according to claim 3, wherein each of the stretch arms comprises a main portion and a fasten portion extending from one terminal of the main portion.

5. The electronic device according to claim 4, wherein the bottom cover comprises a base unit to support the plate; the bottom cover comprises a first side wall, a second side wall, a third side wall coupled to the first side wall and the second side wall, a fourth side wall opposite to the third side wall, and a fifth side wall; a first gap is formed between the second side wall and the fifth side wall; a length of the second side wall is greater than a length of the fifth side wall; a middle part of the fourth side wall is protruded out, for making a height of the middle part of the fourth side wall higher than the first side wall and the second side wall; a height of the third side wall is smaller than the first side wall and the second side wall; the bottom cover further comprises a sixth side wall, a seventh side wall, a eighth side wall coupled to the sixth side wall and the seventh side wall, a ninth side wall, a first stopper portion extending from the ninth side wall, and a second stopper portion extending from the seventh side wall; each height of the sixth side wall and the seventh side wall are greater than the eighth side wall.

6. The electronic device according to claim 5, wherein when the top cover is disconnected from the bottom cover, the base board of the plate slides to the fourth side wall along the first side wall, the second side wall, the sixth side wall, and the seventh side wall of the base unit, and then to strike the fourth side wall; the terminals drop from the corresponding at least two of the plurality of terminal grooves.

7. The electronic device according to claim 1, wherein a number of the signal terminals is less than that of the plurality of terminal grooves, and a diameter of each terminal groove is larger than a diameter of each signal terminal.

8. The electronic device according to claim 7, wherein the at least two signal terminals are conductive balls.

9. The electronic device according to claim 8, wherein each of the terminal couplers comprises a pair of electrodes, the terminal couplers are electrically connected to the at least two signal terminals, and generates a first relation signal to enable the electronic device to operate normally.

10. The electronic device according to claim 1, wherein when the electronic device is powered on again after a reassembly, positions of the at least two signal terminals will be changed from initial positions on the at least two of the plurality of terminal grooves, and a second relation signal is generated for indicating a current location relationship between the at least two signal terminals and the at least two of the plurality of terminal grooves, which cannot enable the electronic device to operate normally.

* * * * *